3,299,128
SUBSTITUTED CYCLIC PHOSPHONITRILIC COMPOUNDS AND METHODS OF PREPARING SAME
Harry Rex Allcock, Darien, and Robert Louis Kugel, South Norwalk, Conn., assignors to American Cyanamid Company, Stamford, Conn., a corporation of Maine
No Drawing. Filed July 10, 1964, Ser. No. 381,892
4 Claims. (Cl. 260—543)

The present invention relates to novel compounds (III) prepared from the reaction of a phosphonitrilic halide trimer or tetramer (I) with a substituted or unsubstituted diamino aromatic compound (II) and a base, pursuant to the following equation

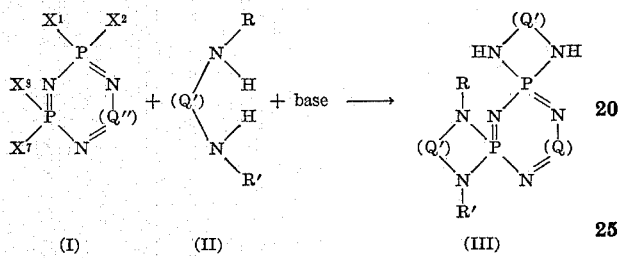

wherein Q" represents

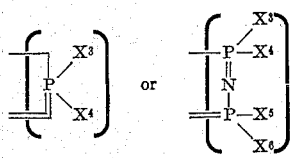

wherein Q represents

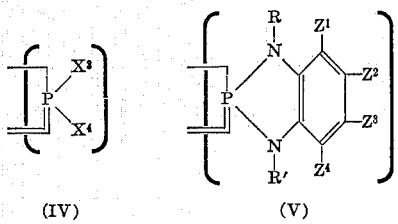

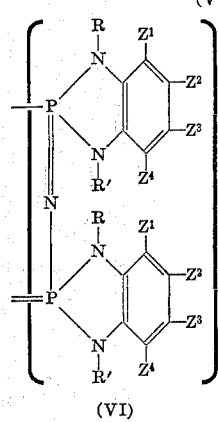

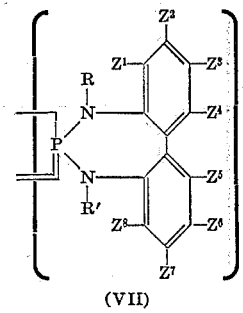

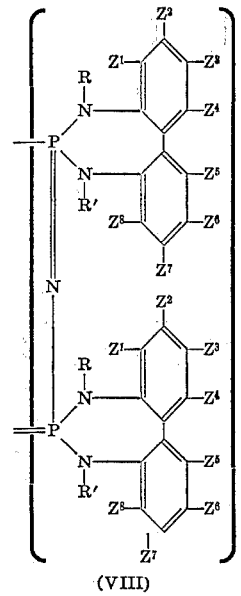

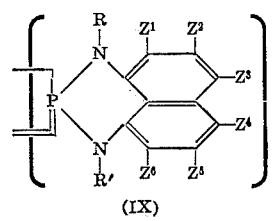

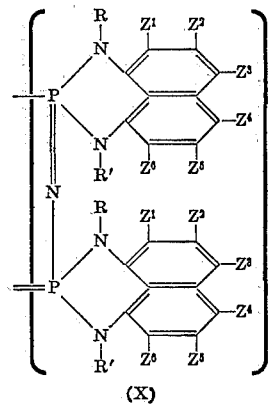

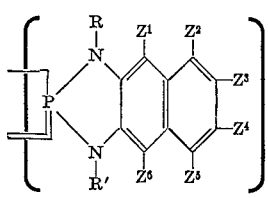

(XI)

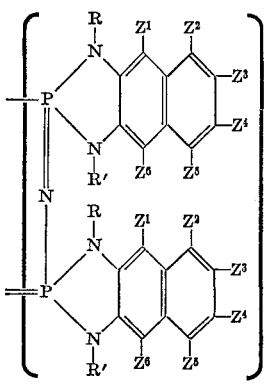

(XII)

and Q' represents (XIII) to (XVI):

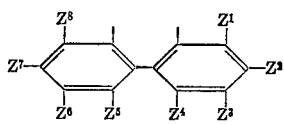

(XIII)

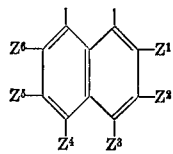   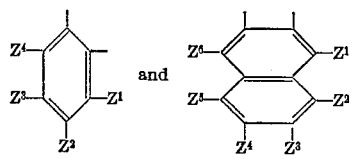

(XIV)        (XV)            (XVI)

wherein $X^1$ through $X^8$ in the above formulae each represent chlorine or bromine, $Z^1$ through $Z^8$ each represent hydrogen, lower alkyl, halogen, lower alkoxy, nitro, halogeno (lower) alkyl, or other inert (stable) substituents, and R and R' each represent lower alkyl. This reaction is made to take place in the presence of organic solvent and the base is one which is capable of forming stable salts with hydrogen chloride or hydrogen bromide.

Typical bases within the purview of the present invention are: alkali metal hydroxides and carbonates, such as potassium, sodium and lithium hydroxides and carbonates; alkaline earth hydroxides and carbonates, such as calcium, magnesium, barium and ammonium hydroxides and carbonates; quaternary ammonium hydroxides, such as benzyltrimethylammonium hydroxide, tribenzylmethylammonium hydroxide, and tetraalkyl(lower)ammonium hydroxide; guanidines and biguanides, such as hexaalkyl(lower)biguanide, heptaalkyl(lower)biguanide, and tetraalkyl(lower)guanidine; trialkyl(lower) amines, such as triethylamine, tributylamine, and trimethylamine; ammonia; pyridine; and the like.

Typical inert organic solvents contemplated herein are: ethers, such as dioxane, diethoxyethane, dimethoxyethane, diethylether of diethylene glycol, and tetrahydrofuran; aromatic hydrocarbons, such as benzene, toluene, xylene, mesitylene; acetonitrile; dimethylformamide; dimethylsulfoxide; halogenated aliphatic ($C_1-C_8$) hydrocarbons, such as chloroform, trichloroethylene; ketones, such as acetone, diethyl ketone, methylethyl ketone, diisobutyl ketone; and the like. An excess of the base, such as pyridine, trialkylamine, and the like, may be used as a solvent if such base is liquid at reaction temperature. Preferably, however, the solvents listed above are employed.

While the reactions of the present invention are best carried out at a temperature in the range of 25° C. to 100° C., temperatures in the range of —50° C. to 200° C. are contemplated herein. Likewise, atmospheric pressure is preferred, but super-atmospheric pressures and sub-atmospheric pressures may be employed generally with an accompanying change in temperature. For instance, at super-atmospheric pressures higher temperatures may be employed since the boiling temperature of the solvent varies in proportion to the pressure thereon. Generally, when operating at atmospheric pressure, temperatures below the boiling point of the solvent are employed.

Obviously, the molar ratio of reactants (II) to (I), above, determines the product (III) produced by the process of the present invention. For example, the di-substituted trimer represented by product (III), wherein Q is moiety (IV), requires that about 2 moles (say, 1.7 to 2.3 moles) of reactant (II) per mole of reactant (I) be used. By the same token, the tri-substituted trimer product (III), wherein Q is moiety (V), (VII), (IX) or (XI), requires about 3 moles (say, 2.8 to 3.3 moles) of reactant (II) per mole of reactant (I). To produce the tetrasubstituted tetramer in which Q of product (III) represents moiety (VI), (VIII), (X) or (XII) about 4 moles (say, about 3.8 to 4.3 moles) of reactant (II) per mole of reactant $(NPX_2)_4$ is required.

The products (III) of the present invention are valuable flame retardants for fabrics. For example, up to about 10% concentration in a suitable solvent may serve as a bath for the treatment of fabrics by dipping the latter in said bath for a period of time. Cotton fabric, for instance, thus treated exhibits notable and very desirable flame retardant properties.

While not intended to diminish the scope of the present invention, the following examples are illustrative:

EXAMPLE 1

Trisubstituted trimer

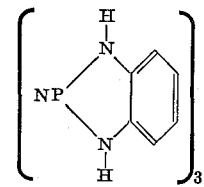

To a solution of phosphonitrilic chloride trimer (34.8 grams; 0.1 mole) in tetrahydrofuran (200 milliliters) is added slowly a solution of ortho-phenylenediamine (32.4 grams; 0.3 mole) and triethylamine (60.6 grams; 0.6 mole) in tetrahydrofuran (300 milliliters). Heat is evolved and a white precipitate forms in the tan-colored mixture. This mixture is then refluxed for 20 hours cooled to room temperature, and filtered. The filter-cake is washed with tetrahydrofuran (100 milliliters) and dried to give a solid which weighs 98.6 grams. This is then washed with 3 liters of water to remove triethylamine hydrochloride and leave a residue of 17 grams of a white solid. The infrared spectrum of this material is consistent with the structure

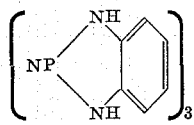

The product is insoluble in hot benzene, toluene, carbon tetrachloride, heptane, sparingly soluble in hot tetrahydrofuran and soluble in dioxane with the formation of a red color. It is also soluble in methanol, ethanol, acetone and dimethylformamide. It does not melt below 300° C. Some of the same material is obtained by treatment of the tetrahydrofuran filtrates with water.

EXAMPLE 2

Phosphonitrilic chloride trimer (34.8 grams; 0.1 mole) is dissolved in tetrahydrofuran (250 milliliters) and to this stirred solution is added a solution of orthophenylenediamine (32.4 grams; 0.3 mole) in tetrahydrofuran (150 milliliters), followed by solid sodium carbonate (63.6 grams; 0.6 mole). The mixture is heated at reflux temperature for 48 hours, then cooled to room temperature, and the white precipitate filtered off. The precipitate is extracted with cold water to remove sodium bicarbonate, then washed with tetrahydrofuran and dried at room temperature under vacuum (24.4 grams; 54%). The infrared spectrum is consistent with the product structure of Example 1, above.

EXAMPLE 3

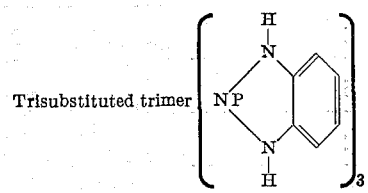

Trisubstituted trimer

Phosphonitrilic chloride trimer (34.8 grams; 0.1 mole) is dissolved in tetrahydrofuran (200 milliliters) and to this solution is added a solution of ortho-phenylenediamine (32.4 grams; 0.3 mole) and triethylamine (60.6 grams; 0.6 mole) in tetrahydrofuran (300 milliliters). The mixture is heated at reflux temperature for 18 hours. The reaction is cooled, the white precipitate filtered off and washed with tetrahydrofuran. The precipitate is washed with water then dried at room temperature under vacuum (32.8 grams; 72.3%). Infrared spectra are consistent with the structure of Example 1, above. The $P^{31}$ nuclear magnetic resonance spectrum in ethanol shows a single peak at −20 part per million, which is consistent with this structure.

EXAMPLE 4

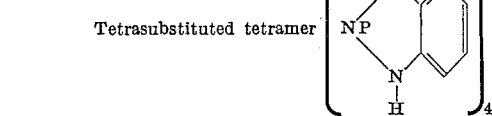

Tetrasubstituted tetramer

Phosphonitrilic chloride tetramer $(NPCl_2)_4$ (34.8 grams) is treated with ortho-phenylenediamine (32.4 grams) and triethylamine (60.6 grams) in tetrahydrofuran (500 milliliters) by the same procedure as before. The mixture is refluxed for 16 hours, cooled, filtered, washed with tetrahydrofuran and water. The white residue gives an infrared spectrum which is consistent with the tetrasubstituted tetramer formula, above.

EXAMPLE 5

Disubstituted trimer

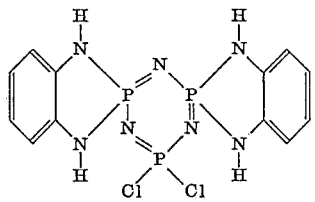

Phosphonitrilic chloride trimer (34.8 grams; 0.1 mole) is dissolved in tetrahydrofuran (200 milliliters) and is treated dropwise over 2 hours with a mixture of ortho-phenylenediamine (21.6 grams; 0.2 mole) and triethylamine (40.4 grams, 0.4 mole) in tetrahydrofuran (200 milliliters). The reaction is allowed to proceed at 25° C. for another 2 hours and the resulting solids filtered off (40.4 grams). The filtrate is then refluxed for 2 hours and more solids are filtered off (14.0 grams). After three days at 25° C., a further 10.6 grams of crystals separates from the filtrate. The infrared spectrum of this material is consistent with the disubstituted trimer product formula, above.

The following Table I further illustrates the present invention:

TABLE I

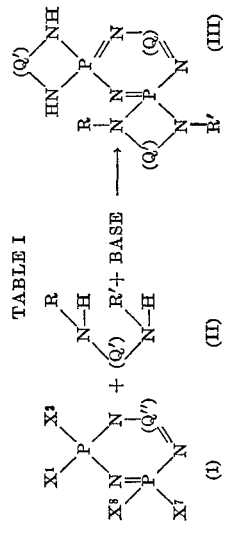

| Example No. | X¹ | X² | X³ | X⁴ | X⁵ | X⁶ | X⁷ | X⁸ | R | R' | Q' | Base | Mole Ratio I:II:Base | Temp., °C. | Solvent | (III) |
|---|---|---|---|---|---|---|---|---|---|---|---|---|---|---|---|---|
| 6 | Cl | Cl | Cl | Cl | | | Cl | Cl | H | H | biphenyl with OCH₃ groups | Sodium carbonate | 1:2.0:5 | 25 | Acetone | di- |
| 7 | Cl | Cl | Cl | Cl | | | Br | Br | CH₃ | H | tetrachloronaphthalene | Pyridine | 1:2.0:7 | 75 | Trichloroethylene | di- |
| 8 | Br | Br | Br | Br | | | Br | Br | H | C₂H₅ | nitrobenzene | Ammonium hydroxide | 1:32:6 | 100 | Dioxane | tri- |
| 9 | Br | Br | Br | Br | Cl | Cl | Cl | Cl | CH₃ | CH₃ | chloromethylnaphthalene | Ammonia | 1:40:8 | 22 | Chloroform | tetra- |
| 10 | Cl | Cl | Cl | Cl | | | Cl | Cl | C₃H₇ | H | dibromobiphenyl | Sodium hydroxide | 1:2.8:3 | 20 | Dimethylformamide | tri- |
| 11 | Br | Br | Br | Br | | | Br | Br | C₂H₅ | C₂H₅ | biphenyl | Triethylamine | 1:30:4 | 45 | Tetrahydrofuran | tri- |
| 12 | Cl | Cl | Cl | Cl | | | Br | Br | H | H | dinitronaphthalene | Tetraethylguanidine | 1:3.3:6 | 65 | Dioxane | tri- |

TABLE I—Continued

| Example No. | X¹ | X² | X³ | X⁴ | X⁵ | X⁶ | X⁷ | X⁸ | R | R' | Q' | Base | Mole Ratio I:II:Base | Temp., °C. | Solvent | (III) |
|---|---|---|---|---|---|---|---|---|---|---|---|---|---|---|---|---|
| 13 | Cl | Cl | Br | Br | | | Br | Br | H | $C_4H_9$ | methylphenyl | Benzyltrimethylammonium hydroxide | 1:2.0:5 | 90 | Chloroform | di- |
| 14 | Cl | Cl | Cl | Cl | | | Br | Br | H | H | diethoxyphenyl ($C_2H_5O$, $C_2H_5O$) | Tribenzylmethylammonium hydroxide | 1:3.0:5 | 41 | Diethoxyethane | tri- |
| 15 | Cl | Cl | Cl | Br | | | Br | Br | $CH_3$ | $CH_3$ | naphthyl | Tetraethylammonium hydroxide | 1:8.6:6 | 10 | Diethylether of diethylene glycol | tri- |
| 16 | Cl | Br | Br | Br | Br | Br | Br | Br | H | H | naphthyl | Pyridine | 1:2.9:4 | −30 | Pyridine | tri- |
| 17 | Br | Br | Br | Br | Br | Cl | Br | Br | H | H | $C_4H_9$-biphenyl-$C_4H_9$ | Ammonia | 1:4.2:8 | 59 | Toluene | Tetra- |
| 18 | Cl | Cl | Cl | Cl | Cl | Cl | Cl | Cl | $C_2H_5$ | H | chloromethylphenyl (Cl) | Pyridine | 1:4.1:8 | 20 | Mesitylene | tetra- |
| 19 | Cl | Cl | Cl | Br | | | Br | Br | H | $C_4H_9$ | chloro-ethyl-naphthyl ($C_2H_4Cl$) | Lithium hydroxide | 1:1.9:5 | 15 | Acetonitrile | di- |
| 20 | Cl | Cl | Cl | Cl | | | Cl | Cl | H | H | ethoxy-chloro-naphthyl ($OC_2H_5$, Cl) | Calcium carbonate | 1:2.2:5 | 95 | Diisobutyl ketone | di- |

The above Table I, as in Examples 1 through 5, further illustrates the present invention. Product (III) in the last column of the table is obvious from reactants (I) and (II) and the mole ratio recited in the table. Therefore, only the prefix of the product is given in the last column. For instance, the product of Example 6 is the corresponding disubstituted trimer of reactants (I) and (II).

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A compound of the formula

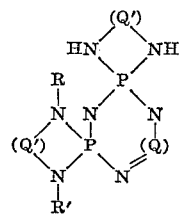

wherein Q represents a member selected from the group consisting of

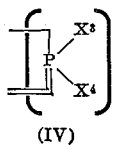

(IV)

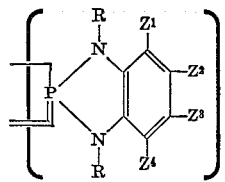

(V)

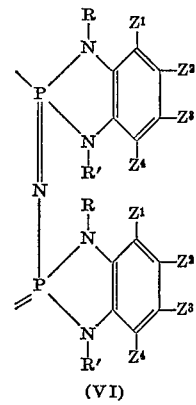

(VI)

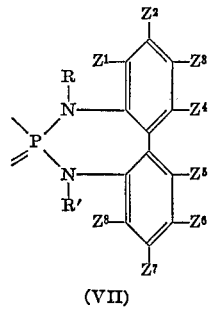

(VII)

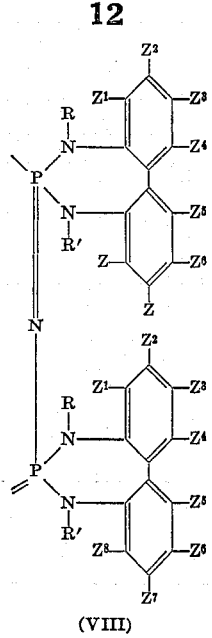

(VIII)

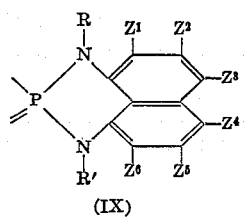

(IX)

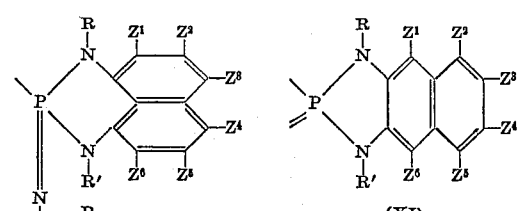

(X)    (XI)

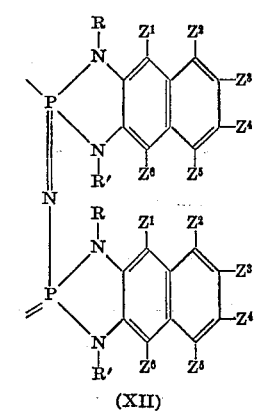

(XII)

and Q' represents a member selected from the group consisting of

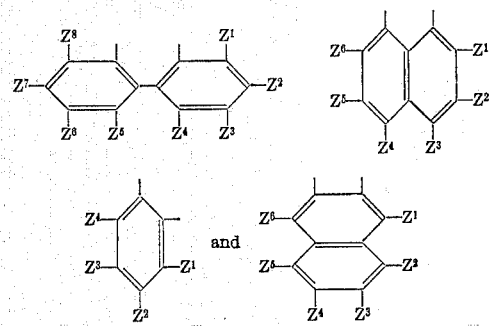

wherein $X^3$ and $X^4$ each represent a member selected from the group consisting of chlorine and bromine;
$Z^1$ through $Z^8$ each represent a member selected from the group consisting of hydrogen, lower alkyl, halogen, lower alkoxy, nitro, and halogeno(lower)alkyl;
and R and R' each represent lower alkyl.

2. The disubstituted trimer

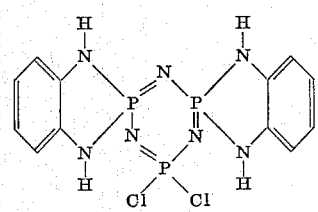

3. The trisubstituted trimer

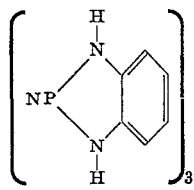

4. The tetrasubstituted tetramer

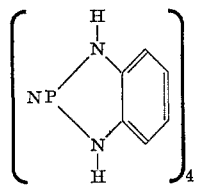

References Cited by the Examiner

Bode et al.: Berichte, vol. 81, pp. 547–52 (1948).

WALTER A. MODANCE, *Primary Examiner.*
H. I. MOATZ, *Assistant Examiner.*